May 31, 1949. M. S. BAKER 2,471,669
POWER TRANSMITTING DEVICE
Filed Sept. 28, 1946
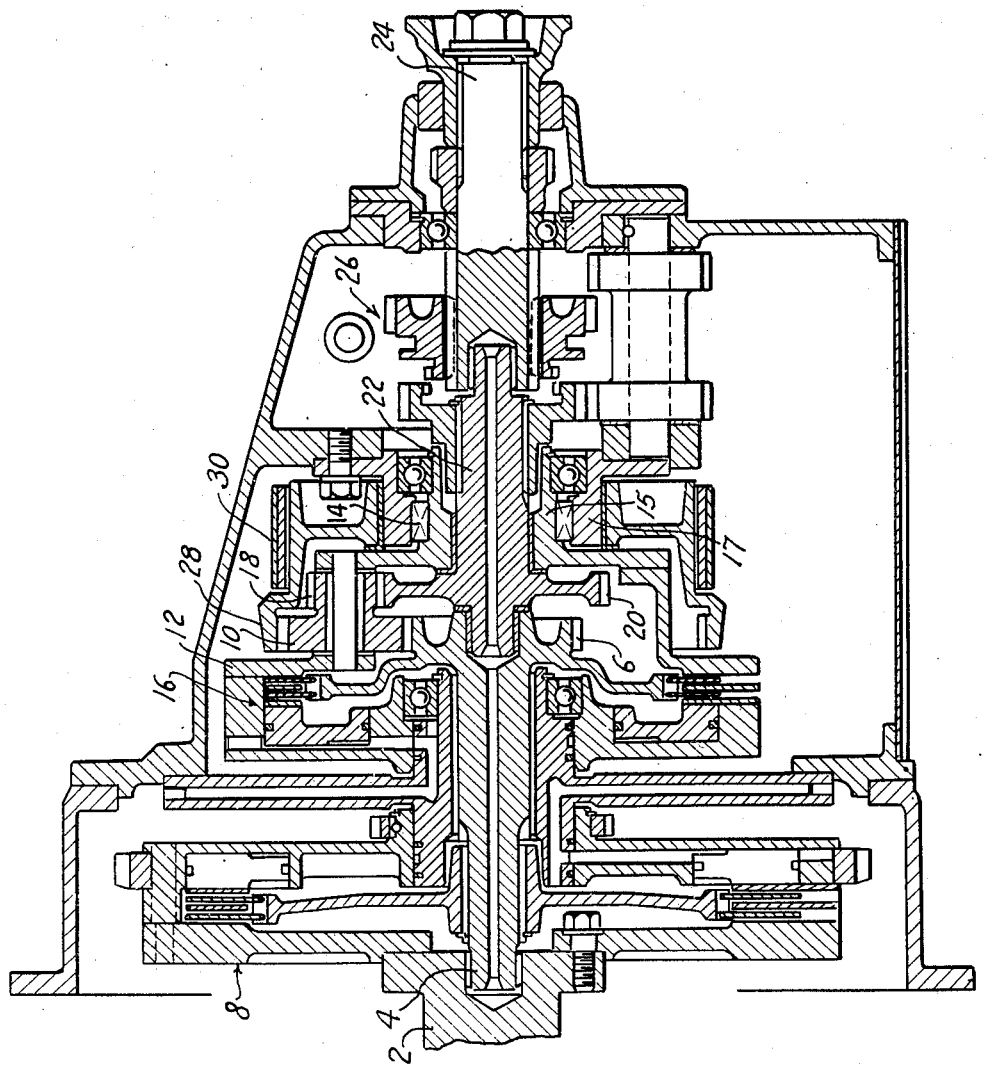
INVENTOR.
Malvern S. Baker
BY Hauke & Hardesty
ATTORNEYS Patented May 31, 1949

2,471,669

UNITED STATES PATENT OFFICE 2,471,669

POWER-TRANSMITTING DEVICE

Malvern S. Baker, North Muskegon, Mich., assignor to Continental Motors Corporation, Muskegon, Mich., a corporation of Virginia Application September 28, 1946, Serial No. 700,097

2 Claims. (Cl. 74—765)

This invention relates to devices for transmitting mechanical power or torque, especially to transmissions for automotive vehicles.

In automotive vehicles powered by internal combustion engines, it is necessary that the engine run at a relatively high speed compared to the propeller shaft speed, when the vehicle is started from a stationary position. As the vehicle picks up speed, the ratio of engine speed to propeller shaft speed may gradually be reduced to unity. In conventional transmissions, this is accomplished in a series of steps, but in shifting from one step to another, the connection with the engine is broken.

It is an object of this invention to provide a transmission for automotive vehicles in which the ratio of engine speed to propeller shaft speed may be changed automatically from its lowest designed ratio to unity through three steps without interrupting the connection between the engine and propeller shaft. This is accomplished in a transmission having a planetary gear train combined with a ring gear. Shifting may be accomplished manually or automatically by speed and torque responsive controls.

The sole figure of the drawing is a longitudinal sectional view through a transmission made according to the invention.

An engine crank shaft 2 drives input shaft 4 and power gear 6 through a disc or other suitable clutch 8. Power gear 6 is the input sun gear of a planetary gear train having one or more planet gears 10 meshing with the sun gear and mounted so that the axis of gear 10 may rotate about the sun gear. This mounting means consists of a planet carrier 12; planet carrier 12 is held against rotation in a direction opposite to the rotation of power gear 6 by means of any suitable one-way brake 14. Brake 14 is disposed between the hub 15 of planet carrier 12 and the surrounding stationary flange 17 secured to the housing. A clutch such as the disc clutch 16 is provided to couple the planet carrier with the power gear 6 so that the entire planetary gear train may rotate as a unit. Clutch 16 may be actuated automatically by speed responsive devices or if desired by a torque sensitive device, or it may be actuated manually.

Integral with gear 10 is another planet gear 18 which meshes with a sun gear 20 on output shaft 22. Shaft 22 may be connected to a propeller shaft 24 through any suitable reversing gear train indicated generally at 26.

A ring gear 28 is mounted to rotate about an axis which is substantially the axis of power gear 6, and meshes with gear or gears 10. A brake 30 is provided to hold ring gear 28 against rotation.

Operation

This transmission is in low gear when clutch 16 is disengaged and brake 30 is off—i. e., ring gear 28 is free to rotate. It will be found that ring gear 28 rotates in a direction opposite to the normal direction of rotation of power gear 6. In low gear the planet carrier 12 is held against backward rotation by the one-way brake 14. Power is thus transmitted through the planetary gear train according to speed ratios which are determined solely by the number of teeth in the sun and planet gears.

For the shift into second or intermediate gear, brake 30 is actuated, or set, to stop backward rotation of ring gear 28. The planet carrier 12 now rotates in the forward direction, being released for rotation in this direction by the one-way brake 14. Brake 30 may be set automatically in response to any of a number of conditions, or it may be controlled manually.

For the shift into direct drive, brake 30 is released and clutch 16 is engaged simultaneously. Through clutch 16, power gear 6 then drives planet carrier 12 as a unit, rotating output sun gear 20 in the same direction and at the same speed as power gear 6.

In shifting from direct drive to intermediate, clutch 16 is disengaged and brake 30 is actuated. In shifting from intermediate into low gear brake 30 is released.

I claim:

1. In combination, a power gear, a second gear meshing with the power gear, rotatable mounting means for the second gear whereby the second gear may rotate about its own axis and the axis of the second gear may rotate about the power gear, a hub integral with the mounting means, a stationary flange surrounding the hub, a one-way brake disposed between the hub and the flange and arranged to hold the mounting means against rotation in a direction opposite to the direction of rotation of the power gear, a third gear meshing with the second gear and rotatable on the stationary flange, means to hold the third gear against rotation, an output shaft rotatable inside the aforesaid hub, gears connecting the aforesaid second gear with the output shaft, and means operable to lock the mounting means to said power gear to rotate the whole as a unit.

2. In combination, a power gear, a second gear meshing with the power gear, rotatable mounting means for the second gear whereby the second gear may rotate about its own axis and the axis of the second gear may rotate about the power gear, a hub integral with the mounting means, a stationary flange surrounding the hub, a one way brake disposed between the hub and the flange and arranged to hold the mounting means against rotation in a direction opposite to the direction of rotation of the power gear, a third gear meshing with the second gear and rotatable on the stationary flange, means to hold the third gear against rotation, an output shaft rotatable inside the aforesaid hub, gears connecting the aforesaid second gear with the output shaft, clutch means engageable to couple the mounting means to the power gear to rotate the whole as a unit, and a hydraulically operated piston positioned to effect engagement of the clutch means.

MALVERN S. BAKER.

REFERENCES CITED

The following references are of record in the file of this patent:

UNITED STATES PATENTS

| Number | Name | Date |
|---|---|---|
| 694,407 | McElroy | Mar. 4, 1902 |
| 716,930 | Ough | Dec. 30, 1902 |
| 752,867 | Sintz | Feb. 23, 1904 |
| 1,731,972 | Fay et al. | Oct. 15, 1929 |
| 2,009,477 | Clayton | July 30, 1935 |
| 2,077,387 | Banker | Apr. 20, 1937 |